Patented Sept. 29, 1953

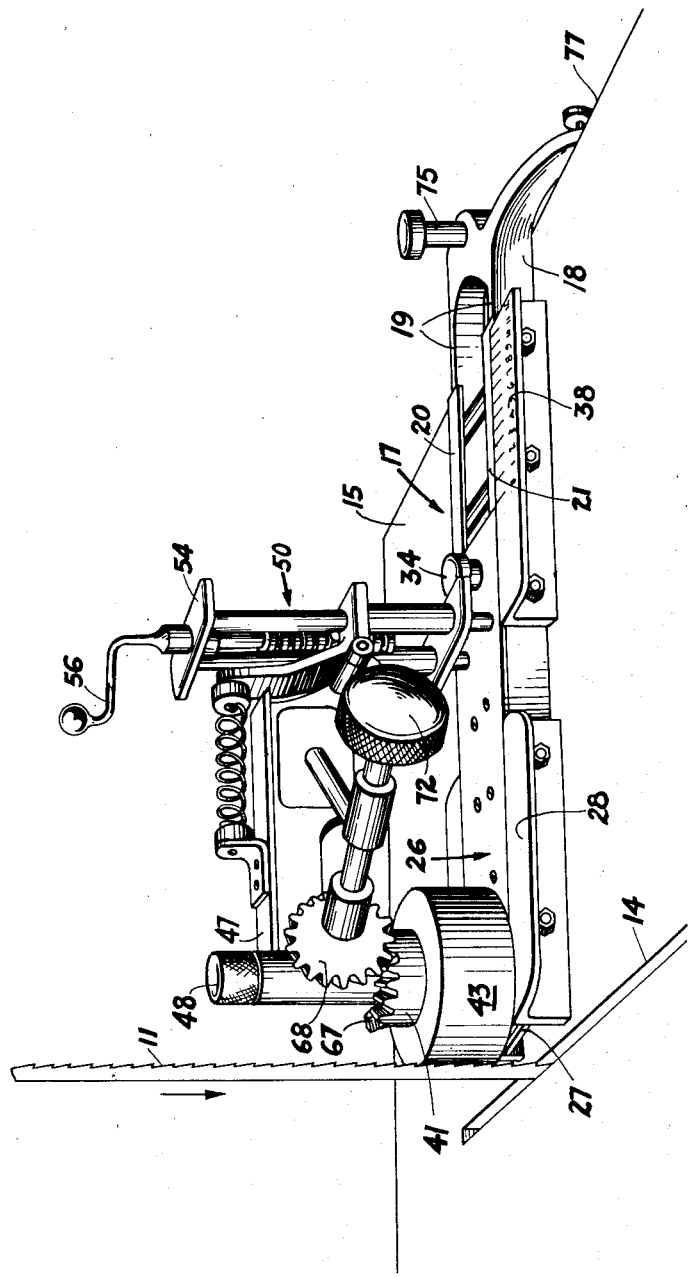

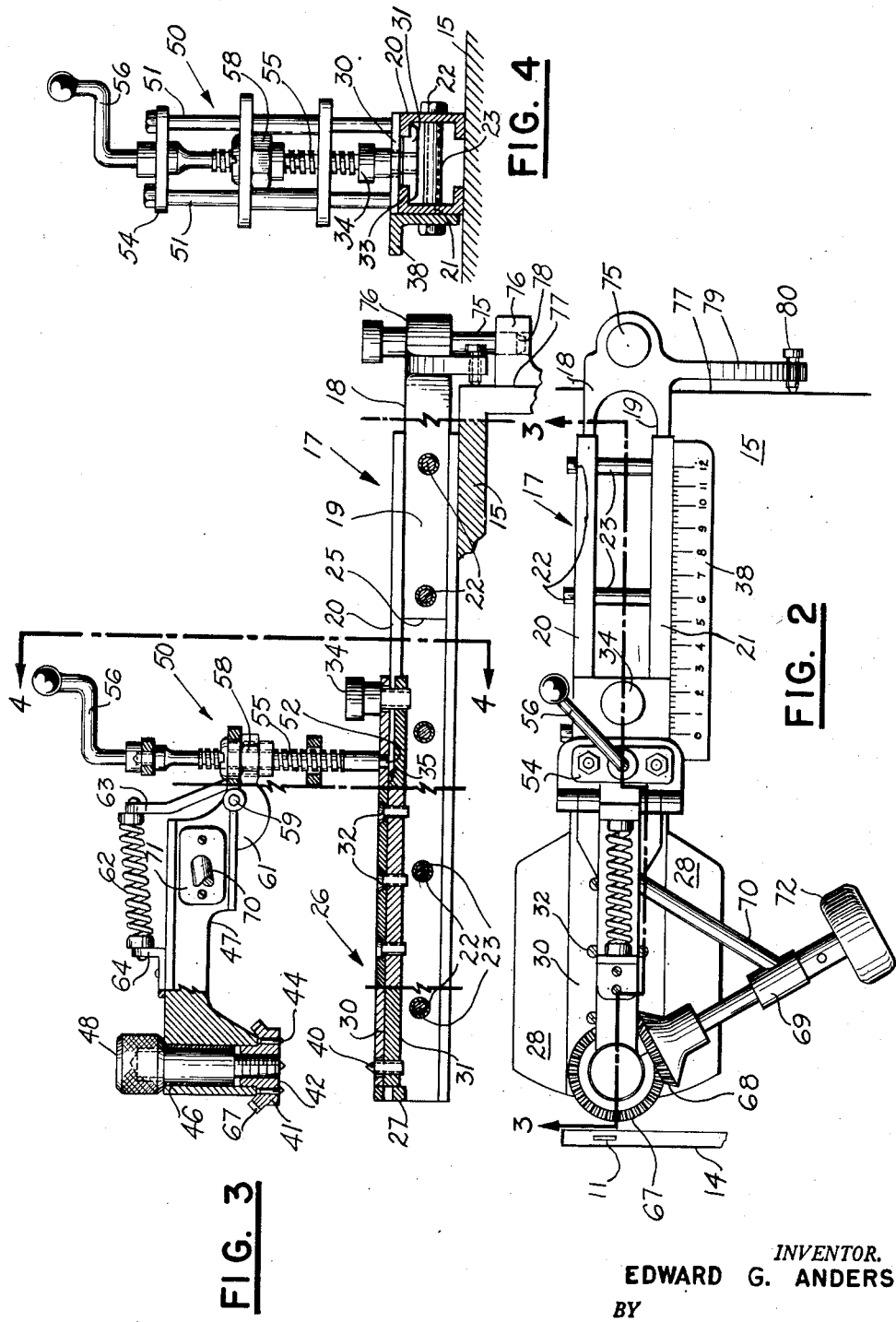

2,653,633

UNITED STATES PATENT OFFICE 2,653,633

FIXTURE FOR CUTTING CIRCULAR PIECES

Edward G. Anderson, Philadelphia, Pa.

Application June 25, 1947, Serial No. 757,039

3 Claims. (Cl. 143—171)

(Granted under Title 35, U. S. Code (1952), sec. 266)

The invention described herein may be manufactured and used by or for the Government of the United States of America for governmental purposes without the payment of any royalties thereon or therefor.

This invention pertains to the art of machine tools, and more particularly to power saws. The invention comprises a fixture for holding a workpiece while it is being sawed by the machine, the fixture being operable to saw the workpiece circular.

In the art of bending tubing, it is common prior-art practice to have the tubular piece filled with shot when it is being bent, to prevent the tubing from buckling under the strain of bending it. The ends of the tube are plugged to hold the shot confined therein, wooden plugs being commonly used. The fixture of the disclosed embodiment of the invention is particularly adapted to produce such wooden plugs.

Pursuant to the practice of the invention, the fixture comprises a base which is movable with reference to the tool of the machine tool to locate a workpiece held by the fixture in position for machining it. Work-feeding mechanism is supported by the base. An attachment for the base secures the fixture to the machine tool, and comprises guiding mechanism that directs movement of the base to determine the path of the fixture towards and away from the tool of the machine tool. A stop limits movement of the fixture in the direction towards the tool, thereby to locate the work-feeding mechanism in proper machining position with reference to the tool.

In the case of the invention being for the specific job of sawing work circular, the fixture is adapted for use on a standard power saw having a work-support table. The work-feeding mechanism is a chuck rotatable on the base of the fixture, which rests on the table and holds the chuck with its axis disposed in a predetermined direction to form a predetermined angle with the cutting path of the saw blade. The axis of the chuck is perpendicular to the table and parallel to the path of the saw blade in the specific embodiment disclosed, to cut the workpieces cylindrical. The fixture is slidably movable along the table of the machine tool, and the attachment for the fixture comprises a pivot pin to swing the fixture in a predetermined curved path along the table surface towards the saw blade. A stop limits movement of the fixture to locate the chuck to position the work for the saw blade to make the desired cut.

A platen carries the chuck and comprises a center pin projecting from the face of the platen. A chuck head is mounted on a carriage, which is supported by the platen to hold the chuck head opposed to the center pin, in clamping engagement with a workpiece between them. The carriage is movable to traverse the chuck head towards and away from platen for adjusting the chuck to hold different thicknesses of work. A drive for the chuck head rotates the work on the center pin to feed the work to the tool and cut the workpiece circular.

The platen is movable in guideways of the base to position the center pin nearer to or farther away from the saw blade for adjusting the fixture to cut the workpiece to a given desired diameter.

Principles of the present invention, and structure and operation of apparatus that constitutes one practical embodiment thereof, will be more thoroughly understood from the accompanying drawings. In the drawings—

Fig. 1 is a perspective view of a fixture embodying the present invention,

Fig. 2 is a plan view of the fixture of Fig. 1,

Fig. 3 is a side elevation, partly in cross-section taken on line 3—3 of Fig. 2, and Fig. 4 is a cross sectional elevation taken on line 4—4 of Fig. 3, illustrating particularly the carriage construction.

The fixture of the disclosed embodiment is adapted particularly to be used on a band saw, which, in accordance with usual prior-art practice, comprises the saw blade 11, which travels in the direction of the arrow in Fig. 1 through the slot 14 of the table 15 of the machine.

The fixture comprises the base, illustrated generally at 17, which is adapted to slide along the top surface of the table 15. The base comprises the bifurcated member 18, having the arms 19, and the channel pieces 20 and 21, which are attached each to an arm 19 by the bolts 22 in the manner shown. A spacer sleeve 23 is provided for each bolt 22 to hold the channel pieces 20 and 21 the desired distance apart. See Fig. 4. The channel pieces 20 and 21 are elongated to extend beyond the ends 25 of the arms 19, and they thereby provide guideways and a rest for the platen, illustrated generally at 26. Bolts 22 with a companion spacer sleeve 23 for each, are positioned at intervals along the channel pieces 20 and 21, to hold them in desired spaced relationship throughout their lengths. See Fig. 3. A stop member 27 is provided attached to the channel members 20 and 21 interposed between them at their ends, the stop 27 operating to limit movement of the platen 26 along the guideways provided by the channel pieces 20, 21. Angle pieces 28 are provided, attached against the outer surfaces of the channel pieces 20, 21 by bolts 22 as shown, to extend the top surface of the platen 26, and to provide guide rails therefore in the base 17.

The platen 26 comprises the top plate 30 and the bottom plate 31, which are attached to each other held in face-to-face relationship by the screws 32. The side edges of the bottom plate 31 are flanged, as illustrated at 33 in Fig. 4, to provide guiding means which cooperates with the guide rails provided by the angle pieces 28. The platen 26 is adjustable in the guideways formed by angle pieces 28, and longitudinally of the base 17, the platen being held in adjusted position by the set screw 34. The bottom plate is slightly offset or stepped, as illustrated at 35 in Fig. 3, to provide clearance between the plates 30 and 31 for clamping the platen 26 in adjusted position in the guideways by operation of the set screw 34.

The angle piece 38 is attached to the base 17 adjacent to the platen 26 along the path thereof to provide a scale as illustrated in Fig. 2. The scale on angle piece 38 preferably indicates inches of diameter, and serves to indicate the platen 26 being set for cutting workpieces to predetermined desired diameters.

A work-feeding mechanism is supported by base 17, and comprises the center pin 40, which projects from the face of the platen 26, and the chuck head 41, which faces towards the center pin 40, as shown. The center pin 40 is positioned to be coaxial with the chuck head 41, and the chuck head 41 and center pin 40 cooperate to comprise a chuck which engages and holds workpiece 43 to feed it to the saw blade 11, as seen in Fig. 1. Work engaging points 44 project from the face of the chuck head 41 towards the platen 26, and are adapted to be embedded in the workpiece 43. The chuck head 41 is rotatable in the bearing 46 of the bracket 47, the handle or knob 48 being attached to the chuck head 41 at the other end of the bearing 46.

A carriage, indicated generally at 50, supports the bracket 47 and the chuck head 41, and traverse mechanism for the carriage is operable to adjust the location of the chuck head 41 towards and away from the center pin 40 for different thicknesses of work. The posts 51 guide movement of the carriage 50, and project upwardly from the platen 26, the posts 51 being attached thereto, for example by being riveted to the upper plate 30 as indicated at 52. The cross piece 54 is attached to the upper ends of the posts 51, and provides a bearing for the lead or traverse screw 55, which is rotatable, for example manually by means of the handle 56. The nut 58 is traversed by rotation of the lead screw 55, the nut 58 supporting the bracket 47 mounted to swing on the pivot 59. The bracket 47 is rotatable on the pivot 59 to swing the chuck head towards and away from the center pin 40, the stop 61 being provided attached to the nut 58 and comprising an abutment to limit movement of the chuck head 41 towards the center pin 40 and to place the face 42 of the chuck head in parallel relationship with the platen 26 in which position the center pin 40 and chuck head 41 are coaxial with each other. The compression spring 62 acts between the abutment 63 projecting upwardly from the nut 58 and the abutment 64 projecting upwardly from the bracket 47 to actuate the bracket to move the chuck head 41 in a direction towards the pin 40 and oppose reverse movement, the movement towards pin 40 being limited by stop 61.

The fixture of the disclosed embodiment is adapted to accommodate workpieces of various thicknesses within limits determined by the traverse of the lead screw 55. When a workpiece 43 is to be held by the fixture, its material being wood for example, the piece is placed on the platen 26 and pressed against the platen to project the center pin 40 into the material of the piece. Now the lead screw is rotated to advance the chuck head 41 towards the center pin 40 until it engages the surface of the workpiece 43. It is not intended that traverse of the chuck head 41 by means of the lead screw 55 will operate to project the points 44 into the workpiece 43. Instead, the bracket 47 will swing on its pivot 59 against the tension of the spring 62, the lead screw being turned an amount sufficient to place the face 42 of the chuck head 41 in parallel relationship with the platen 26 when the points 44 become projected into the material of the workpiece 43. The nut 58 having been traversed in the manner described, pressure is now applied to the knob 48 to project the points 44 into the material of the workpiece 43, projection of the points 44 into the workpiece 43 being limited by the stop 61 when the face 42 of the chuck head 41 is in contact with the surface of the workpiece 43 and in parallel relationship with the platen 26. See Fig. 1.

Bevel gear 67 is attached to the chuck head 41. Bevel gear 68 is provided in mesh with gear 67, the gear 68 being mounted to rotate in bearing 69, which is supported by the arm 70 attached to the bracket at 47 through the contact plate 71, Fig. 3. The handle or knob 72 is rotatable manually to rotate the gear 68, and the chuck head 41 through gear 67. The chuck head 41 being in engagement with the workpiece 43 by means of the points 44, rotation of the handle or knob 72 operates to rotate the workpiece 43 on the center pin 40, the workpiece sliding on the surface of the platen 26.

The bifurcated member 18 of the base 17 is provided with the pivot pin 75, which constitutes an attachment for securing the fixture in position for operation with the power saw of table 15 and blade 11. The bearing bracket 76 is secured to the edge surface 77 of the table 15 to provide a bearing 78 for the pivot pin 75, the bearing 78 being preferably located with reference to the table 15 to be opposite the saw blade 11. Projecting laterally from the bifurcated member 18 is the arm 79, which carries the stop pin 80 adapted to abut against the edge surface 77 of the table 15 of the machine. The fixture is adapted to slide along the top surface of the table 15, this being swinging movement around the pivot pin 75. The movement is limited by the stop pin 80 engaging the edge surface 77 of the table 15, which locates the center pin 40 approximately in a line between the pivot pin 75 and the saw blade 11, as indicated in Fig. 2. The work-feeding mechanism of chuck 40, 41 is thereby located with reference to the saw blade 11 to hold the workpiece 43 in position to cut it circular.

With a workpiece 43 held chucked between the chuck head 41 and the center pin 40, the fixture is swung on the pivot pin 75 to slide along the surface of the table 15 until the stop pin 80 engages the edge surface 77 of the table 15. This movement has caused the saw blade 11 to cut into the workpiece from the edge thereof to a position in the circle to be cut. Now the knob 72 is turned manually, and this operates to turn the chuck head 41 and the workpiece 43 with it in sliding engagement with the platen 26, the workpiece being thus rotated on the center provided by the pin 40. Turning the workpiece with relationship to the saw blade operates to cut the piece cylindrical, to the contour indicated in Fig. 1. Preparatory to feeding the workpiece 43 to the saw blade 11 in the manner described, the position of the platen 26 was adjusted, and the platen was secured in adjusted position by the set screw 34. The adjustment was made for cutting the workpiece 43 to the desired diameter, as indicated on the scale of 38.

The structure shown in the drawing and described in detail hereinbefore is one practical embodiment of the invention. The invention is not limited to the specific structure disclosed, the scope of the invention being determined by the accompanying claims.

What is claimed is:

1. In a chuck construction for holding a workpiece of wood or the like material, a platen, a center pin projecting from the face of the platen, a guideway projecting from the platen, a carriage movable along the guideway, a chuck head supported by the carriage opposed to the center pin, a pivotal mount between the chuck head and the carriage to swing the chuck head into positions towards and away from the center pin, a stop limiting movement of the chuck head relative to the carriage into position towards the center pin with its face disposed parallel to the platen, a spring holding the chuck head resiliently against the stop, and a traverse for the carriage to actuate it along the guideway.

2. A fixture for a power saw embodying a work-support table, the fixture comprising a base to rest on the table of the saw for the fixture to slide along the table, a work-feeding mechanism supported by the base, an attachment for the base to secure the fixture to the power saw, the attachment being free to permit the base to slide along the table and comprising guiding mechanism for directing the movement of the base to transmit the work-feeding mechanism towards and away from the saw blade of the power saw, the work-feeding mechanism comprising a drive independent of the drive of the power saw to feed the work to the saw blade, the work-feeding mechanism comprising a platen carried by the base and a chuck carried by the platen, the chuck comprising a chuck head positioned opposed to the platen and a center pin projecting from the platen towards the chuck head coaxially therewith, the drive of the work-feeding mechanism being connected to the chuck head with reference to the center pin and platen, the support of the work-feeding mechanism by the base comprising a carriage for the chuck head and traverse mechanism for the carriage projecting away from the platen to adjust the position of the chuck head towards and away from the platen and the center pin, a bracket pivotally mounted to swing on the carriage towards and away from the platen, the chuck head being secured to the bracket in position opposed to the platen, a stop limiting movement of the bracket towards the platen when the chuck head is at a position coaxial with the center pin, a spring tensioned to oppose movement of bracket away from the stop.

3. In combination with a power saw comprising a work-support table, a fixture comprising a base slidable along the table of the saw, a work-feeding mechanism supported by the base, an attachment between the base and the table to secure the fixture to the power saw, the attachment being free to permit the base to slide along the table and comprising guiding mechanism for directing the movement of the base to transmit the work-feeding mechanism towards and away from the saw blade of the power saw, the work-feeding mechanism comprising a drive independent of the drive for the power saw to feed work to the saw blade, the attachment comprising a pivot pin secured to the base, a bearing for the pivot pin secured to the table in position for the work-feeding mechanism to be located in work-feeding position with reference to the saw blade, and a stop limiting movement of the base to hold the work-feeding mechanism located in work-feeding position.

EDWARD G. ANDERSON.

References Cited in the file of this patent

UNITED STATES PATENTS

| Number | Name | Date |
|---|---|---|
| 213,222 | Mayo | Mar. 11, 1879 |
| 509,534 | Hayne | Nov. 28, 1893 |
| 429,072 | Trethewey | May 27, 1890 |
| 557,180 | Anthon | Mar. 31, 1896 |
| 967,129 | Johnston | Aug. 9, 1910 |
| 1,543,100 | Craig | June 23, 1925 |
| 1,611,738 | Guilford | Dec. 21, 1926 |
| 1,639,039 | Knabusch et al. | Aug. 16, 1927 |
| 1,866,704 | Glaze et al. | July 12, 1932 |
| 1,881,802 | Mattison | Oct. 11, 1932 |

FOREIGN PATENTS

| Number | Country | Date |
|---|---|---|
| 41,798 | Switzerland | Dec. 4, 1907 |
| 51,779 | Austria | Jan. 25, 1912 |